United States Patent
Puiu

(10) Patent No.: US 6,991,079 B2
(45) Date of Patent: *Jan. 31, 2006

(54) POWER TRANSFER DEVICE WITH HYDRAULICALLY-ACTUATED CLUTCH ASSEMBLY

(75) Inventor: Dumitru Puiu, Sterling Heights, MI (US)

(73) Assignee: Magna Powertrain, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/151,777

(22) Filed: Jun. 14, 2005

(65) Prior Publication Data

US 2005/0230213 A1    Oct. 20, 2005

Related U.S. Application Data

(63) Continuation of application No. 10/769,646, filed on Jan. 30, 2004.

(51) Int. Cl.
*F16D 25/0638* (2006.01)
*B60K 17/35* (2006.01)

(52) U.S. Cl. .................. 192/35; 192/85 AA; 192/93 A; 180/249

(58) Field of Classification Search ............... 192/35, 192/70.23, 85 AA, 93 A; 180/249, 250; 475/86

See application file for complete search history.

(56) References Cited

U.S. PATENT DOCUMENTS

| | | | |
|---|---|---|---|
| 4,862,769 A | 9/1989 | Koga et al. |
| 4,895,236 A | 1/1990 | Sakakibara et al. |
| 5,119,298 A | 6/1992 | Naito |
| 5,224,906 A | 7/1993 | Sturm |
| 5,323,871 A | 6/1994 | Wilson et al. |
| 5,407,024 A | 4/1995 | Watson et al. |
| 5,423,235 A | 6/1995 | Botterill et al. |
| 6,158,561 A | 12/2000 | Sakai et al. |
| 6,315,096 B1 | 11/2001 | Dairokuno et al. |
| 6,318,532 B1 | 11/2001 | Gassmann |
| 6,422,365 B2 | 7/2002 | Arai et al. |
| 6,478,708 B2 | 11/2002 | Krisher |
| 6,520,880 B1 | 2/2003 | Fukushima et al. |
| 6,595,338 B2 | 7/2003 | Bansbach et al. |

(Continued)

FOREIGN PATENT DOCUMENTS

| JP | 62-18117 | 1/1990 |
|---|---|---|
| JP | 63-66927 | 3/1990 |

*Primary Examiner*—Richard M. Lorence
(74) *Attorney, Agent, or Firm*—Harness, Dickey & Pierce P.L.C.

(57) ABSTRACT

A torque transfer mechanism having a transfer clutch connecting a pair of rotary members and a electrohydraulic clutch actuator for controlling engagement of the transfer clutch. The clutch actuator includes a hydraulic pump and a hydraulically-actuated rotary operator. The hydraulic pump draws low pressure fluid from a sump and delivers high pressure fluid to a series of actuation chambers defined between coaxially aligned first and second components of the rotary operator. The magnitude of the fluid pressure delivered to the actuation chamber controls angular movement of the second component relative to the first component for energizing a pilot ball ramp unit. The pilot ball ramp mechanism applies a clutch actuation force on a pilot friction clutch which energized a main ball ramp unit for applying a clutch engagement force to a main friction clutch. A hydraulic control system adaptively regulates the fluid pressure delivered to the actuation chamber.

29 Claims, 14 Drawing Sheets

U.S. PATENT DOCUMENTS

| | | |
|---|---|---|
| 6,641,267 B2 | 11/2003 | Ohishi et al. |
| 6,691,845 B2 | 2/2004 | Showalter |
| 6,745,879 B1 | 6/2004 | Dolan |
| 2001/0011622 A1 | 8/2001 | Arai et al. |
| 2005/0153807 A1 * | 7/2005 | Puiu ............................ 475/88 |
| 2005/0160728 A1 * | 7/2005 | Puiu ............................ 60/435 |
| 2005/0167223 A1 * | 8/2005 | Puiu ............................ 192/35 |
| 2005/0167224 A1 * | 8/2005 | Puiu ............................ 192/35 |

* cited by examiner

POWER TRANSFER DEVICE WITH HYDRAULICALLY-ACTUATED CLUTCH ASSEMBLY

CROSS-REFERENCE TO RELATED APPLICATIONS

This application is a continuation of U.S. patent application Ser. No. 10/769,646 filed Jan. 30, 2004.

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a torque transfer mechanism equipped with a power-operated clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. When the lock-up clutch is released, drive torque is only delivered to the primary driveline for establishing a two-wheel drive mode.

A modern trend in four-wheel drive motor vehicles is to equip the power transmission device with an adaptively controlled transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). The electric control signals are typically based on changes in current operating characteristics of the vehicle (i.e., vehicle speed, interaxle speed difference, acceleration, steering angle, etc.) as detected by various sensors. Thus, such "on-demand" transfer clutch can utilize adaptive control schemes for automatically controlling torque distribution during all types of driving and road conditions. Such adaptively controlled transfer clutches can also be used in association with a center differential operably installed between the primary and secondary drivelines for automatically controlling interaxle slip and torque biasing in a full-time four-wheel drive application.

A large number of adaptively controlled transfer clutches have been developed with an electro-mechanical clutch actuator that can regulate the amount of drive torque transferred to the secondary driveline as a function of the electric control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force to the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly. Also, U.S. Pat. No. 6,158,561 discloses use of an electromagnetic actuator for engaging a pilot clutch which, in turn, controls energization of a ball ramp unit for engaging the main clutch.

As an alternative to such electromagnetic clutch actuation systems, the transfer clutch can employ an electric motor and a mechanical drive assembly as the power-operated clutch actuator. For example, U.S. Pat. No. 5,323,871 discloses a transfer clutch equipped with an electric motor that controls rotation of a sector plate which, in turn, controls pivotal movement of a lever arm that is operable for applying the clutch engagement force to the multi-plate clutch assembly. Likewise, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer clutch having an electric motor which drives a reduction gearset for controlling movement of a ball screw operator and a ball-ramp operator which, in turn, apply the clutch engagement force to the clutch assembly.

In contrast to the electro-mechanical clutch actuators discussed above, it is also well known to equip the transfer clutch with an electro-hydraulic clutch actuator. For example, U.S. Pat. Nos. 4,862,769 and 5,224,906 generally disclose use of an electric motor or solenoid to control the fluid pressure exerted by an apply piston on a multi-plate clutch assembly. In addition, U.S. Pat. No. 6,520,880 discloses a hydraulic actuation system for controlling the fluid pressure supplied to a hydraulic motor arranged which is associated with a differential gear mechanism in a drive axle assembly.

While many adaptive clutch actuation systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads make many systems cost prohibitive for use in most four-wheel drive vehicle applications. In an effort to address these concerns, new technologies are being developed for use in power-operated clutch actuator applications.

SUMMARY OF THE INVENTION

Thus, its is an objective of the present invention to provide a power transmission device for use in a motor vehicle having a torque transfer mechanism equipped with a unique power-operated clutch actuator that is operable to control engagement of a multi-plate clutch assembly.

As a related objective of the present invention, the torque transfer mechanism is well-suited for use in motor vehicle driveline applications to control the transfer of drive torque between first and second rotary members.

According to each preferred embodiment of the present invention, a torque transfer mechanism and an electrohydraulic control system are disclosed for adaptively controlling the transfer of drive torque between first and second rotary members in a power transmission device of the type used in motor vehicle driveline applications. The torque transfer mechanism includes a main clutch assembly operably disposed between the first and second rotary members, a pilot clutch assembly, and a rotary clutch operator. The rotary clutch operator includes a first and second coaxially aligned components defining a plurality of actuation chambers therebetween. During operation, the magnitude of the fluid pressure delivered by the hydraulic control system to the actuation chambers controls angular movement of the second component relative to the first component. Such relative angular movement controls energization of the pilot clutch assembly which, in turn, controls the magnitude of the compressive clutch engagement force applied to the main clutch assembly, thereby controlling the drive torque transferred from the first rotary member to the second rotary member.

According to another feature of the present invention, the electrohydraulic control system includes a fluid pump, an electric motor for driving the pump, vehicle sensors for detecting various operating characteristics of the motor vehicle, and an electronic control unit (ECU) for receiving input signals from the vehicle sensors and controlling energization of the electric motor. The ECU further controls actuation of a control valve for controlling the magnitude of the fluid pressure supplied to the actuation chambers. A pressure sensor provides a pressure signal to the ECU that is indicative of the fluid pressure in the actuation chambers.

The torque transfer mechanism of the present invention is adapted for use in a power transmission device for adaptively controlling the drive torque transferred between a primary driveline and a secondary driveline. According to one preferred application, the power transmission device of the present invention is a transfer case with the torque transfer mechanism arranged as a torque transfer coupling for providing on-demand torque transfer from the primary driveline to the secondary driveline. In a related application, the torque transfer mechanism is arranged as a torque bias coupling for varying the torque distribution and limiting interaxle slip between the primary and secondary driveline. According to another preferred application, the power transmission device is a drive axle assembly with the torque transfer mechanism arranged as a torque bias coupling to control speed differentiation and torque distribution across a differential unit.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, a torque transfer clutch in a transfer case, a power take-off unit or an in-line torque coupling, a torque biasing clutch associated with a differential unit in full-time transfer cases or power take-off units or in a drive axle assembly, or any other possible torque transfer application. Thus, while the present invention is hereinafter described in association with particular power transmission devices for use in specific driveline applications, it will be understood that the arrangements shown and described are merely intended to illustrate embodiments of the present invention.

Figure 1:
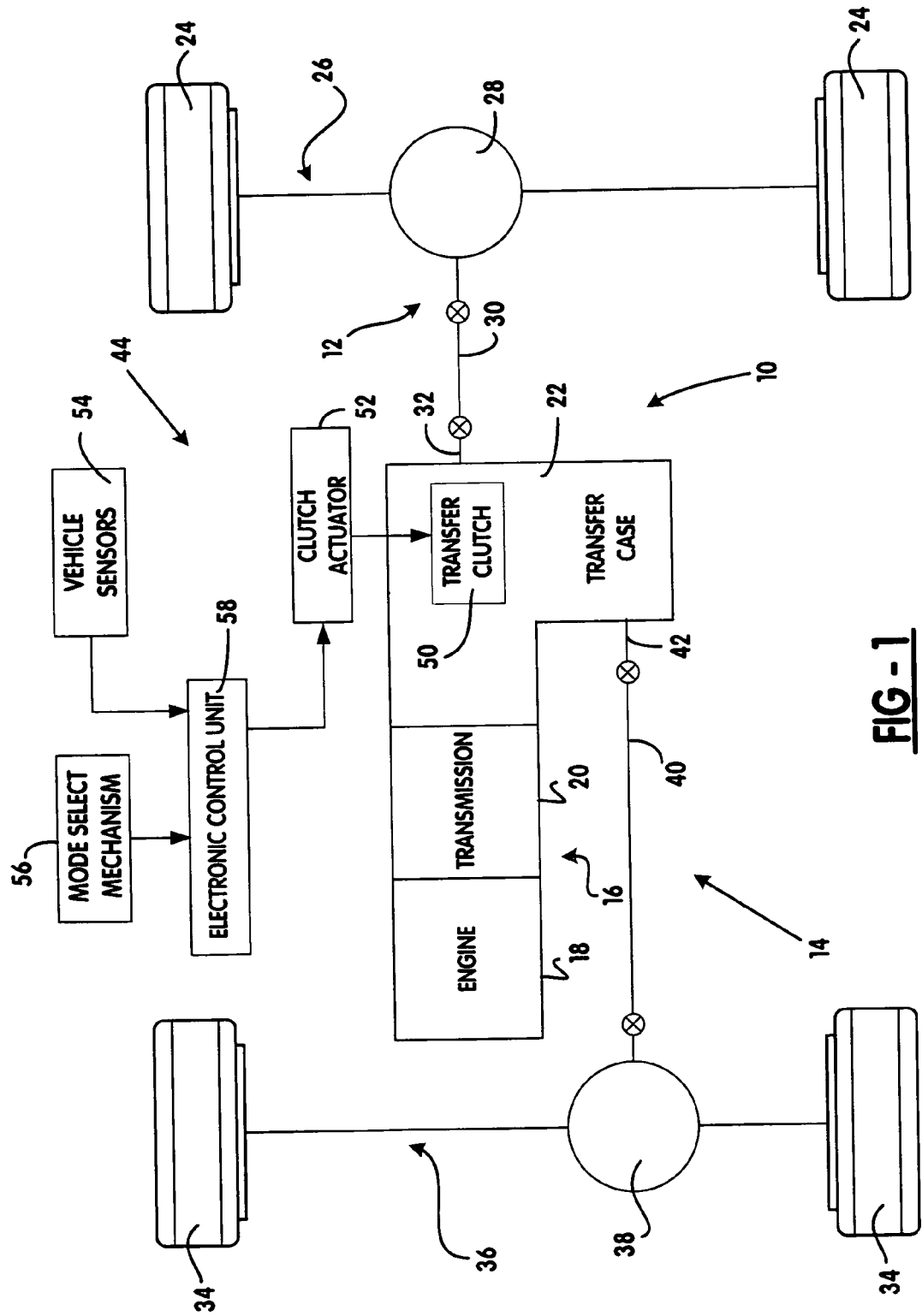
FIG. 1 illustrates the drivetrain of a four-wheel drive vehicle equipped with a power transmission device according to the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34 connected at opposite ends of a front axle assembly 36 having a front differential 38 coupled to one end of a front prop shaft 40, the opposite end of which is coupled to a front prop shaft 42 of transfer case 22.

With continued reference to the drawings, drivetrain 10 is shown to further include an electronically-controlled power transfer system 44 for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing both of the part-time and on-demand four-wheel drive modes. Power transfer system 44 further includes an electrohydraulic clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes, and an electronic control unit (ECU) 58 for controlling actuation of clutch actuator 52 in response to input signals from vehicle sensors 54 and mode selector 56.

Figure 2:
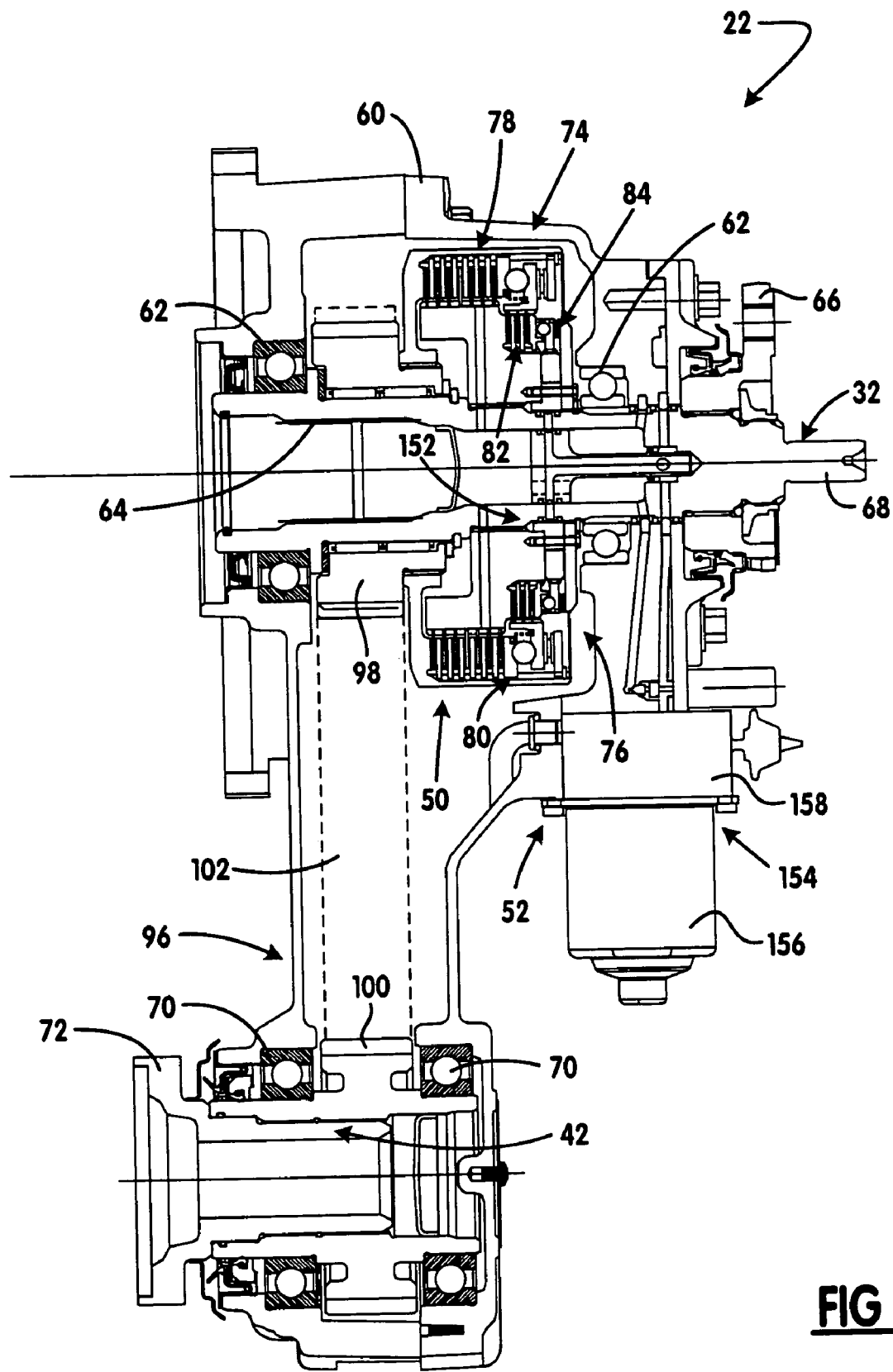
FIG. 2 is a sectional view of a transfer case associated with the drivetrain shown in FIG. 1 and which is equipped with a torque transfer mechanism according to a preferred embodiment of the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and includes a yoke-type end segment 72 that is adapted for connection to front propshaft 40.

In general, transfer clutch 50 and electrohydraulic clutch actuator 52 define a torque transfer mechanism according to the preferred embodiment of the present invention. Transfer clutch 50 includes a main clutch assembly 74 and a pilot clutch assembly 76. Main clutch assembly 74 is shown to include a first multi-plate friction clutch 78 and a first ball ramp unit 80. Likewise, pilot clutch assembly 76 is shown to include a second multi-plate friction clutch 82 and a second ball ramp unit 84. First friction clutch 78 includes a hub 86 fixed (i.e., splined) for rotation with rear output shaft 32, a drum 88 and a multi-plate clutch pack 90 that is operably disposed between hub 84 and drum 88. Clutch pack 90 includes a set of outer clutch plates 92 splined for rotation with drum 88 and which are interleaved with a set of inner clutch plates 94 splined for rotation with hub 84. As will be detailed, clutch actuator 52 is operable for causing a compressive clutch engagement force to be exerted on clutch pack 90. Such engagement of clutch pack 90 causes rotary power ("drive torque") to be transferred from rear output shaft 32 to front output shaft 42 through a transfer assembly 96. Transfer assembly 96 includes a first sprocket 98 fixed (i.e., splined) for rotation with drum 88, a second sprocket 100 fixed (i.e., splined) for rotation with front output shaft 42, and a power chain 102 encircling sprockets 98 and 100. First sprocket 98 is shown fixed to an end plate segment 104 of drum 88 and is rotatably supported on rear output shaft 32 via a suitable bearing assembly 106. A thrust bearing 108 is shown disposed between first sprocket 102 and a lock ring 109 fixed to rear output shaft 32.

First ball ramp unit 80 includes a first cam member 110, a second cam member 112 and rollers 114. First cam member 110 is splined for common rotation with drum 88 and bi-directional translational movement relative to clutch pack 90. Specifically, first cam member 110 is axially moveable between a first or "released" position and a second or "locked" position. In its released position, first cam member exerts a minimum clutch engagement force on clutch pack 90 such that virtually no drive torque is transferred from rear output shaft 32 to front output shaft 42, thereby establishing the two-wheel drive mode. In contrast, movement of first cam member 110 to its locked position causes a maximum clutch engagement force to be exerted on clutch pack 90 such that front output shaft 42 is, in effect, coupled for common rotation with rear output shaft 32, thereby establishing the part-time four-wheel drive mode. Accordingly, variable control of the movement of first cam member 110 between its released and locked position results in adaptive regulation of the drive torque transferred to front output shaft 42, thereby establishing the on-demand four-wheel drive mode.

Second cam member 112 of first ball ramp unit 80 is operably connected to second friction clutch 82. In addition, rollers 114 are disposed in a cam channel defined between cam tracks 116 formed in first cam member 110 and cam tracks 118 formed in second cam member 112. Preferably, a plurality of such cam channels are provided and which are each configured as an oblique section of a helical torus. Balls 114 and cam tracks 116,118 may be replaced with alternative components and/or tapered ramp profiles that functions to cause axial movement of first cam member 110 in response to relative angular movement between the cam members. In any arrangement, the load transferring components can not be self-locking or self-engaging so as to permit fine control over the translational movement of first cam member 110 for providing precise control of the clutch engagement force applied to clutch pack 90. A thrust bearing assembly 120 is disposed between second cam member 112 and a retainer plate 122 that is splined to drum 88. A lock ring 124 axially locates retainer plate 122 for preventing axial movement of second cam member 112.

Second friction clutch 82 includes a multi-plate clutch pack 128 that is operably disposed between second cam member 112 of first ball ramp unit 80 and hub 86 of first friction clutch 78. Clutch pack 128 includes a set of outer plates 130 splined for rotation with second cam member 112 and which are interleaved with a set of inner clutch plates 132 splined for rotation with hub 86. Second ball ramp unit 84 includes a first cam ring 134, a second cam ring 136, and rollers 138. First cam ring 134 is fixed to a pressure plate 140 which, in turn, is splined for rotation with hub 86 of first friction clutch 78. Rollers 138 are disposed in cam channels defined between cam tracks 142 formed in first cam ring 136 and cam tracks 144 formed in second cam ring 136. Again, it is preferred that a plurality of such cam channels be provided between the cam rings with each being configured as an oblique section of a torus. Furthermore, second ball ramp unit 84 is also not self-locking or self-engaging to permit accurate control of bi-directional translational movement of pressure plate 140 relative to clutch pack 128 that is caused in response to relative rotation between cam rings 134 and 136. A thrust bearing 146 is disposed between second cam ring 136 and a retainer ring 148 which, in turn, is rigidly secured for rotation with hub 86 via bolts 150. Such translational movement of pressure plate 140 is operable for controlling the magnitude of pilot actuation force exerted on clutch pack 128 which, in turn, controls energization of first ball ramp unit 80. With pressure plate 140 in a first or "retracted" position, a minimum pilot actuation force is exerted on clutch pack 128 such that first and second cam members of first ball ramp unit 80 are permitted to rotate together, thereby maintaining first cam member 110 in its released position. In contrast, movement of pressure plate 140 to a second or "extended" position causes a maximum pilot actuation force to be exerted on clutch pack 128 which, in turn, causes second cam member 112 to rotate relative to first cam member 110. Such relative rotation results in axial movement of first cam member 110 to its locked position.

To provide means for moving pressure plate 140 between its retracted and extended positions, clutch actuator 52 generally includes a rotary operator 152 and an electrohydraulic power unit 154. Power unit 154 is secured to housing 60 and includes an electric motor 156 and a fluid pump 158. Rotary operator 152 is shown to include a first or "reaction" ring 160 that is concentrically aligned with a second or "actuator" ring 162. The rings are retained between clutch hub 86 and retainer ring 148. As seen, bolts 150 also pass through mounting bores 164 in reaction ring 160 such that reaction ring 160 is fixed to hub 86 for common rotation with rear output shaft 32.

Figure 4:
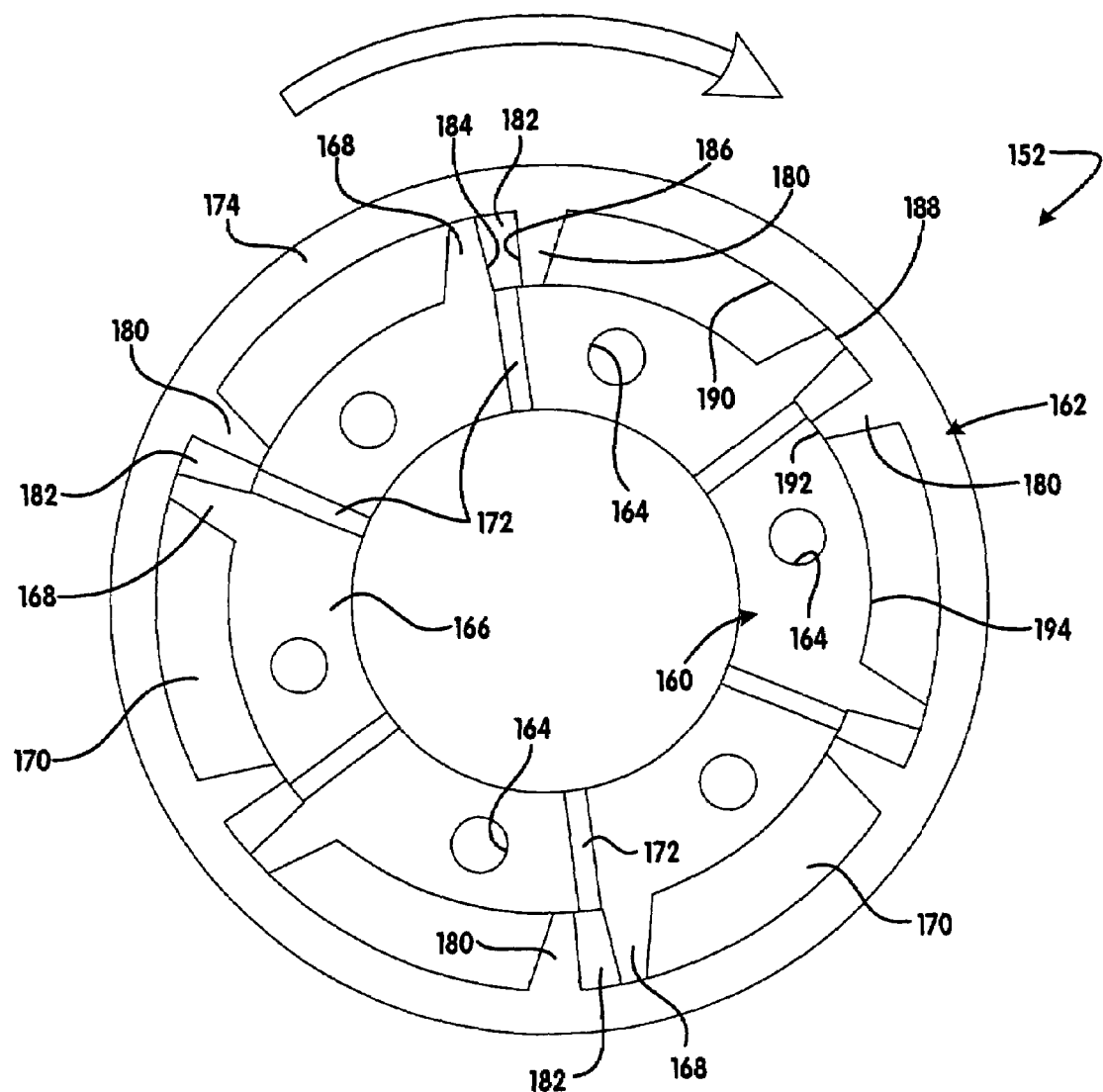
FIG. 4 is a partial sectional view of a rotary operator mechanism associated with the torque transfer mechanism of the present invention.

As best seen from FIG. 4, reaction ring 160 includes a cylindrical body segment 166 and a plurality of radially outwardly projecting lugs 168. Lugs 168 define a complementary number of longitudinally extending channels 170 therebetween with a like number of radial inlet ports 172 extending through body segment 166 and communicating with channels 170. Actuator ring 162 also has a cylindrical body segment 174 that is fixed via a spline connection 176 to second cam ring 136 of second ball ramp unit 84. In addition, a plurality of radially projecting lugs 180 extend inwardly from body segment 174. Each lug 180 extends into a corresponding one of channels 170 so as to define a series of actuation chambers 182 delimited by a face surface 184 of lugs 168 and a face surface 186 of lugs 180. Likewise, a distal end surface 188 on each lug 168 is in sliding engagement with an inner wall surface 190 of body segment 174 while a distal end surface 192 on each lug 180 is in sliding engagement with outer wall surface 194 of body segment 166 so as to further delimit each actuation chamber 182.

As noted, reaction ring 160 includes a series of inlet ports 172 that are in communication with actuation chambers 182. As will be described, increasing the fluid pressure delivered through inlet ports 172 to actuation chambers 182 causes actuator ring 162 to move (i.e., index) in a first rotary direction (i.e., clockwise) relative to reaction ring 160 for energizing pilot ball ramp unit 84 which, in turn, causes corresponding movement of pressure plate 140 toward its extended position, In contrast, decreasing the fluid pressure in actuation chambers 182 causes actuator ring 162 to move in a second rotary direction (i.e., counterclockwise) relative to reaction ring 160 for de-energizing pilot ball ramp unit 84 which, in turn, causes corresponding movement of pressure plate 140 toward its retracted position.

Main ball ramp unit 80 further includes a torsional return spring 196 that is operably connected between first cam member 110 and second cam member 112. Return spring 196 functions to angularly bias the cam members for moving first cam member 110 toward its released position so as to de-energize main ball ramp unit 80. Such angular movement between the cam members due to the biasing of return spring 196 also results in rearward translation of first cam ring 134 toward its retracted position for de-energizing pilot ball ramp unit 84. The resulting angular movement of second cam ring 136 relative to first cam ring 134 acts to index actuator ring 162 in the second direction relative to reaction ring 160 toward a first or "low pressure" position, as is shown in FIG. 4. Rotary operator 152 is designed to provide fluid leakage paths which permit fluid in actuation chambers 182 to leak out at a predetermined rate so as to permit the biasing force of return spring 196 to angularly bias actuator ring 162 to move toward its low pressure position.

In operation, the delivery of fluid to actuation chambers 182 causes actuator ring 162 to rotate relative to reaction ring 160 in the first direction from its low pressure position toward a second or "high pressure" position which, in turn, results in corresponding relative rotation between cam rings 134 and 136 for moving first cam ring 134 from its retracted position toward its extended position. In essence, such angular movement of actuator ring 162 acts to initiate energization of pilot ball ramp unit 84. Accordingly, the profile of cam tracks 142 and 144 establishes the resultant amount of forward axial movement of first cam ring 134 which causes pressure plate 140 to exert a corresponding pilot actuation force on clutch pack 128. Engagement of clutch pack 128 effectively couples second cam member 112 of main ball ramp unit 80 for rotation with hub 86 and rear output shaft 32. This action results in relative rotation between the cam members 110 and 112 and translational movement of first cam member 110 toward its locked position.

With pressure plate 140 in its retracted position, first cam member 110 is located in its released position such that virtually no drive torque is transferred from rear output shaft 32 to front output shaft 42 through transfer clutch 50, thereby effectively establishing the two-wheel drive mode. In contrast, movement of pressure plate 140 to its extended position causes corresponding movement of member 110 to its locked position. As such, a maximum amount of drive torque is transferred to front output shaft 42 for, in effect, coupling front output shaft 42 for common rotation with rear output shaft 32, thereby establishing the part-time four-wheel drive mode. Accordingly, controlling the position of pressure plate 140 between its retracted and extended positions permits variable control of the amount of drive torque transferred from rear output shaft 32 to front output shaft 42, thereby establishing the on-demand four-wheel drive mode. Thus, the magnitude of the fluid pressure supplied to actuation chambers 182 controls the angular position of actuator ring 162 relative to reaction ring 160 for controlling actuation of pilot ball ramp unit 84 and, in turn, axial movement of pressure plate 120 between its retracted and extended positions.

Figure 5:
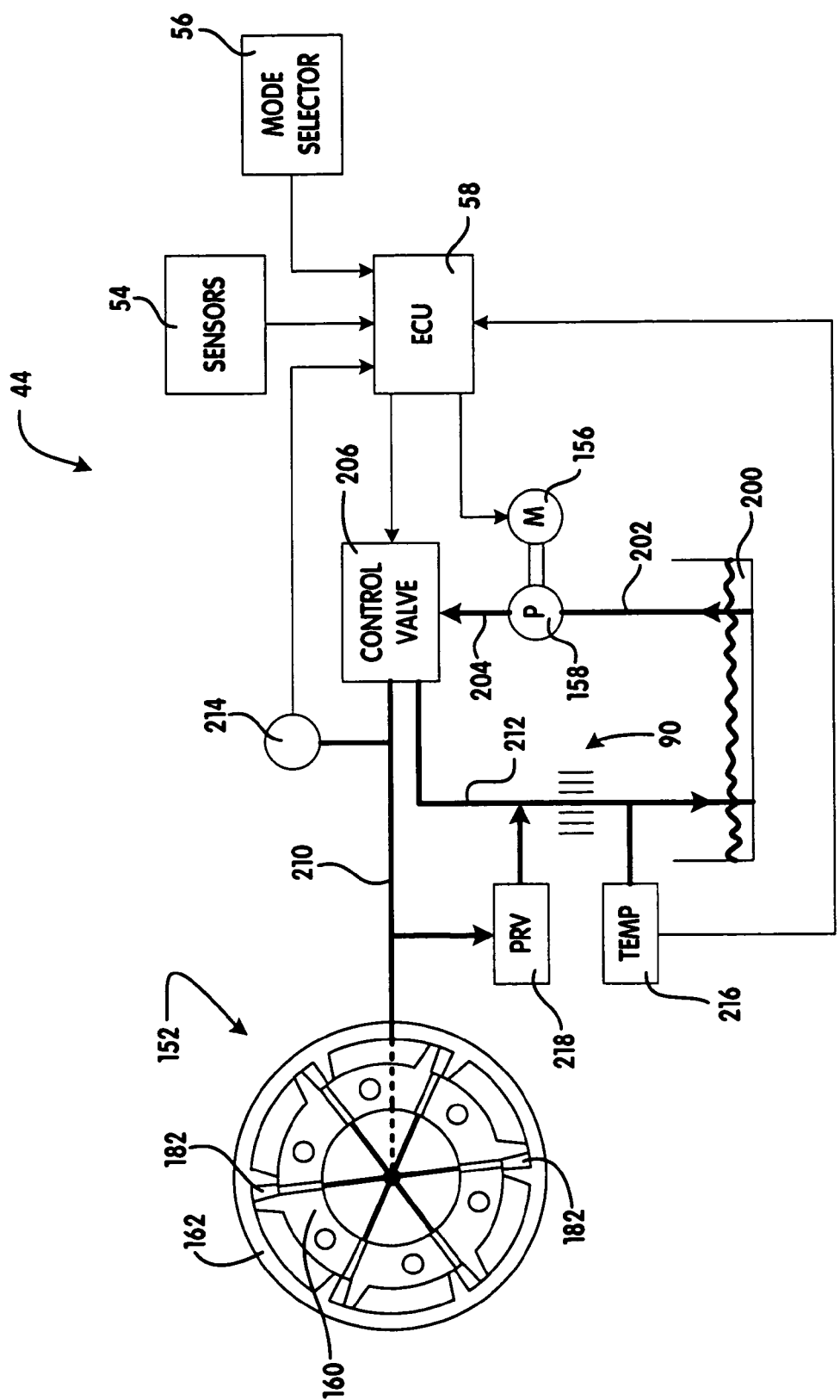
FIG. 5 is a schematic diagram of a hydraulic control circuit associated with the torque transfer mechanism of the present invention.

A hydraulic flow circuit is provided within transfer case 22 for supplying fluid from pump 158 to actuation chambers 182. Referring initially to FIG. 5, a schematic of the hydraulic flow circuit will be described. Specifically, hydraulic fluid from a source of fluid or sump 200 maintained with transfer case housing 60 is drawn through a first flow path 202 to an inlet of pump 158. Actuation of motor 156 controls the magnitude of the line pressure delivered through a second flow path 204 from an outlet of pump 158 to an inlet of an electrically-actuated control valve 206. Control valve 206 includes a moveable valve element 208 (see FIG. 3B) that regulates the delivery of fluid from its inlet to at least one of a pair of outlets. It will be understood that any type of electrically-actuated control valve capable of regulating the fluid pressure supplied to actuation chambers 182 can be used. The first outlet supplies fluid to actuation chambers 182 of rotary operator 152 through a third flow path 210 while the second outlet supplies fluid to cool and lubricate clutch pack 90 through a fourth flow path 212.

ECU 58 sends electrical control signals to both electric motor 156 and control valve 206 for accurately controlling the fluid pressure supplied through third flow path 210 to actuation chambers 182 by utilizing a predefined control strategy that is based on the mode signal from mode selector 56 and the sensor input signals from vehicle sensors 54. A pressure sensor 214 sends a signal to ECU 58 that is indicative of the fluid pressure in actuation chambers 182. In addition, a temperature sensor 216 sends a signal to ECU 58 that is indicative of the fluid temperature in fourth flow path 212 for permitting improved control over the cooling of clutch pack 90. Finally, a pressure relief valve 218 is provided for selectively venting fluid from actuation chambers 182 into fourth flow path 212 so as to limit the fluid pressure within actuation chambers 182 to a predetermined maximum pressure value.

Figure 3A:
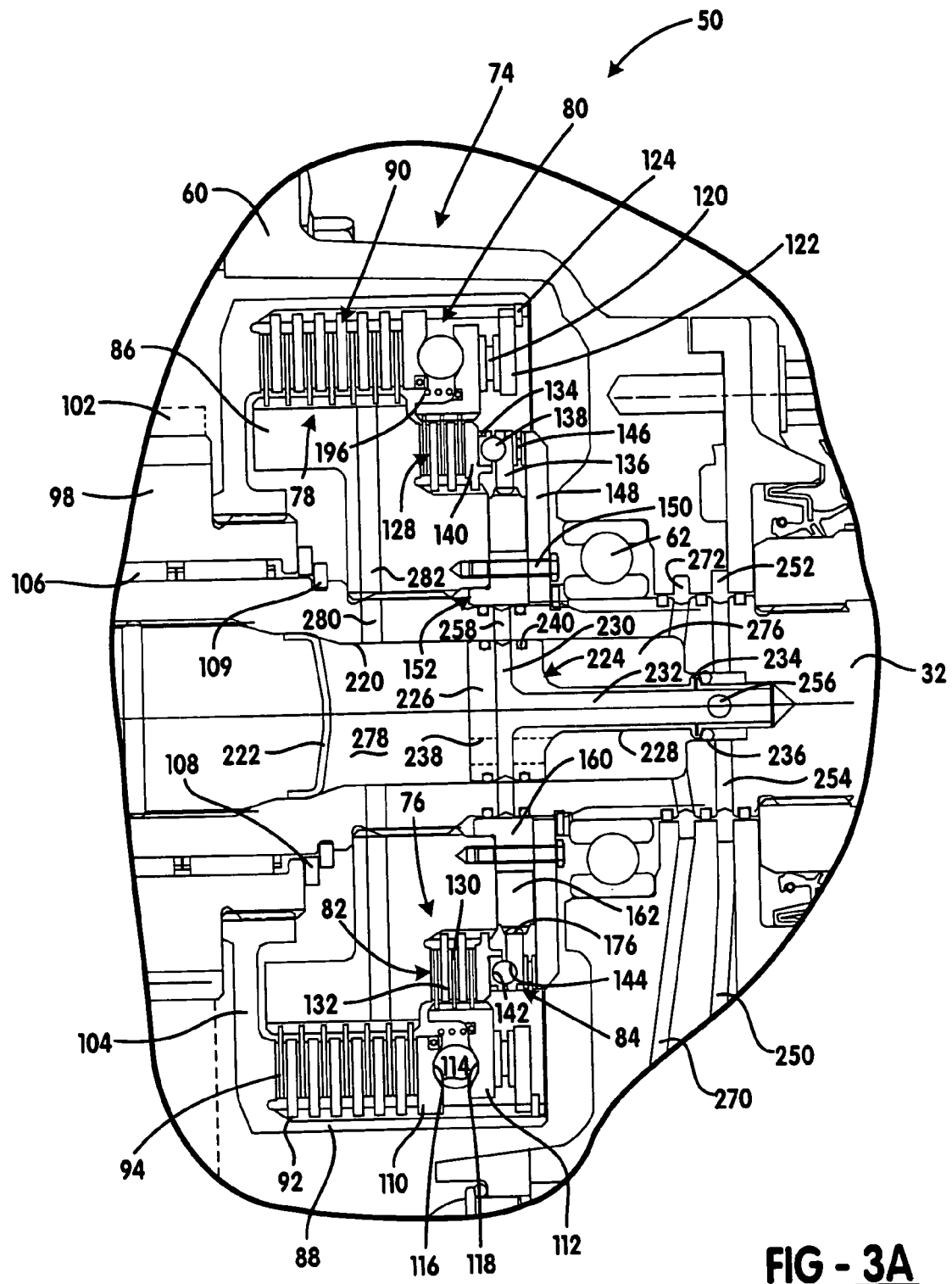
FIGS. 3A and 3B are enlarged partial views taken from FIG. 2 showing components of the torque transfer mechanism is greater detail.
Figure 3B:
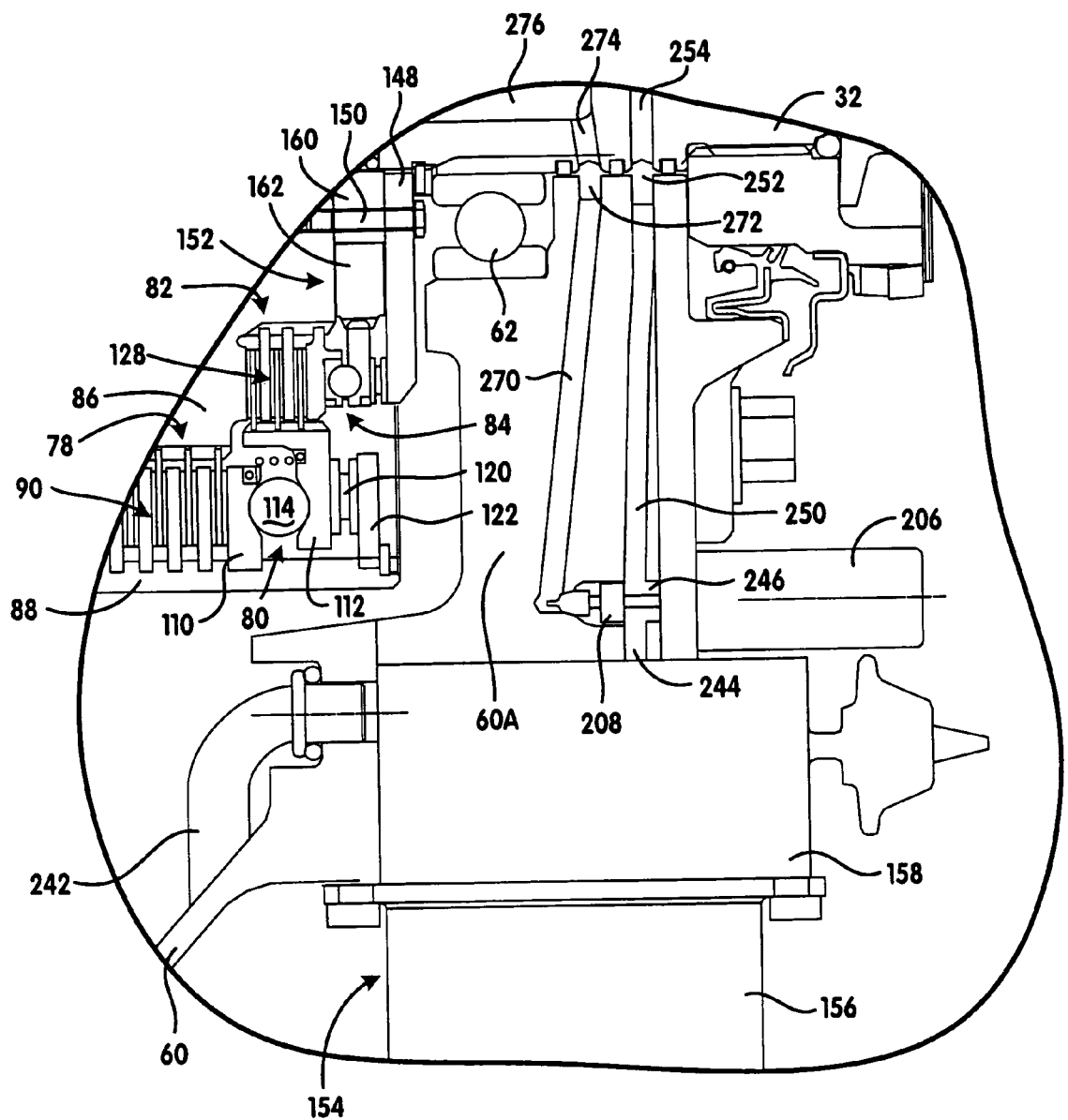

Referring primarily now to FIGS. 3A and 3B, the structure associated with transfer case 22 for providing the flow paths schematically shown in FIG. 5 will now be described in greater detail. As seen, a central chamber 220 is formed in rear output shaft 32 and is sealed via a seal cup 222. A separator 224 is retained within chamber 220 and includes a cylindrical hub segment 226 and an elongated tube segment 228. Hub segment 226 has a series of radial flow ports 230 which communicate with a large diameter longitudinal flow port 232 formed in tube segment 228. In addition, an end portion of tube segment 228 is retained in a small diameter portion of central chamber 220 and has a flange 234 delimiting an intermediate diameter portion of central chamber from its large diameter portion. A ring seal 236 provides a fluid-tight interface between the intermediate and large diameter portions of central chamber 220. In addition, one or more by-pass ports 238 extend through hub segment 226 of separator 224. Suitable seal rings 240 provide a fluid-tight seal between radial flow ports 230 and large diameter portion of chamber 220.

First flow path 202 includes an inlet hose 242 which provides fluid communication between the internal fluid sump 200 provided within housing 60 and the inlet to pump 158. Second flow path 204 includes a flow port 244 which delivers fluid at line pressure to a valve chamber 246 within which valve element 208 is retained. Flow port 244 and valve chamber 246 are formed in a valvebody segment 60A of housing. Third flow path 210 includes a flow passage 250 formed in valvebody housing segment 60A which communicates with the first outlet of valve chamber 246, an annular chamber 252 which communicates with passage 250, and a series of radial passages 254 formed in rear output shaft 32 which provide fluid communication between chamber 252 and the intermediate diameter portion of central chamber 220. Radial ports 230 and longitudinal port 232 in separator 224 are also part of third flow path 210 and are in fluid communication with intermediate diameter portion of central chamber 220 via one or more throughbores 256 in tube segment 228. Third flow path 210 also includes a plurality of radial flow passages 258 formed through rear output shaft 32 which connect radial ports 230 in separator 224 with radial inlet ports 172 extending through body segment 166 of reaction ring 160. As such, the fluid supplied from valve chamber 246 to the inlet of flow passage 250 will flow through third flow path 210 into actuation chambers 182.

Fourth flow path 212 includes a flow passage 270 in valvebody housing segment 60A which communicates with the second outlet of valve chamber 246, an annular chamber 272 which communicates with passage 270, and a series of radial passages 274 formed in rear output shaft 32 which interconnect chamber 272 to a first chamber 276 formed in large diameter portion of central chamber 220. First chamber 276 surrounds tube segment 288 of separator 224 and is in fluid communication with a second chamber 278 via by-pass ports 238. Fourth flow path 212 further includes a series of radial passages 280 formed through rear output shaft 32 which communicate with throughbores 282 formed in clutch hub 86. As such, low pressure fluid supplied from valve chamber 246 to the inlet of flow passage 270 will flow through this flow path and through the interleaved clutch plates of clutch pack 90 before returning to sump 200. In this manner, the heat generated within clutch pack 90 can be transferred to the fluid prior to its return to sump 200.

In operation, if the two-wheel drive mode is selected, control valve 206 is de-actuated such that valve element 208 moves to a position where the inlet to flow passage 250 is blocked. As such, the biasing of return spring 196 and the leakage paths within rotary operator 152 cause actuator ring 162 to index relative to reaction ring 160 in the second direction toward its low pressure position, whereby pilot ball ramp unit 84 is de-energized and pressure plate 140 is permitted to return to its retracted position. With pilot clutch 82 released, main ball ramp unit 80 is de-energized such that main clutch 78 is also released. In contrast, upon selection of the part-time four-wheel drive mode, control valve 206 is fully activated to move valve element 208 to a position where flow passage 250 receives the full line pressure from pump 158 through port 244. This high pressure fluid is delivered through third flow path 210 to actuation chambers 182 for causing actuator ring 162 to index relative to reaction ring 160 in the first direction until located in its high pressure position, whereby pilot ball ramp unit 84 is fully energized and pressure plate 140 is moved to its extended position for fully engaging pilot clutch 82. As such, main ball ramp unit 80 is energized to move first cam member 110 to its locked position for fully engaging main friction clutch 78. As stated, the pressure signal sent from pressure sensor 214 to ECU 58 in conjunction with the use of pressure relief valve 218 function to limit the maximum fluid pressure that can be delivered to actuation chambers 182, thereby preventing damage to clutch pack 90.

When mode selector 52 indicates selection of the on-demand four-wheel drive mode, ECU 58 energizes motor 156 for initiating a fluid pumping action in pump 158 and also controls energization of control valve 206 for supplying a predetermined initial fluid pressure to actuation chambers 182 that results in a slight indexing of actuator ring 162 relative to reaction ring 160 in the first direction. This angular movement causes actuator ring 162 to move from its low pressure position to an intermediate or "ready" position which, in turn, results in main ball ramp unit 80 moving first cam member 110 from its released position to a "stand-by" position. Accordingly, a predetermined minimum amount of drive torque is delivered to front output shaft 42 through transfer clutch 50 in this adapt-ready condition. Thereafter, ECU 58 determines when and how much drive torque needs to be transferred to front output shaft 42 based on the current tractive conditions and/or operating characteristics of the motor vehicle, as detected by sensors 54. Sensors 54 detect such parameters as, for example, the rotary speed of the output shafts, the vehicle speed and/or acceleration, the transmission gear, the on/off status of the brakes, the steering angle, the road conditions, etc. Such sensor signals are used by ECU 58 to determine a desired output torque value utilizing a control scheme that is incorporated into ECU 58. This desired torque value is used to actively control actuation of electric motor 156 and control valve 206 to generate a corresponding pressure level in actuation chamber 182. One non-limiting example of a clutch control scheme and the various sensors used therewith is disclosed in commonly-owned U.S. Pat. No. 5,323,871 which is incorporated by reference herein.

In addition to adaptive torque control, the present invention permits automatic release of transfer clutch 50 in the event of an ABS braking condition or during the occurrence of an over-temperature condition. Furthermore, while the control scheme was described based on an on-demand strategy, it is contemplated that a differential or "mimic" control strategy could likewise be used. Specifically, the torque distribution between rear output shaft 32 and front output shaft 42 can be controlled to maintain a predetermined rear/front ratio (i.e., 70:30, 50:50, etc.) so as to simulate the inter-axle torque splitting feature typically provided by a mechanical differential unit. Regardless of the control strategy used, accurate control of the fluid pressure delivered from pump 156 to actuation chambers 182 of rotary operator 152 will result in the desired torque transfer characteristics across transfer clutch 50. Furthermore, it should be understood that mode select mechanism 56 could also be arranged to permit selection of only two different drive modes, namely the on-demand 4WD mode and the part-time 4WD mode. Alternatively, mode select mechanism 56 could be eliminated such that the on-demand 4WD mode is always operating in a manner that is transparent to the vehicle operator.

Figure 6:
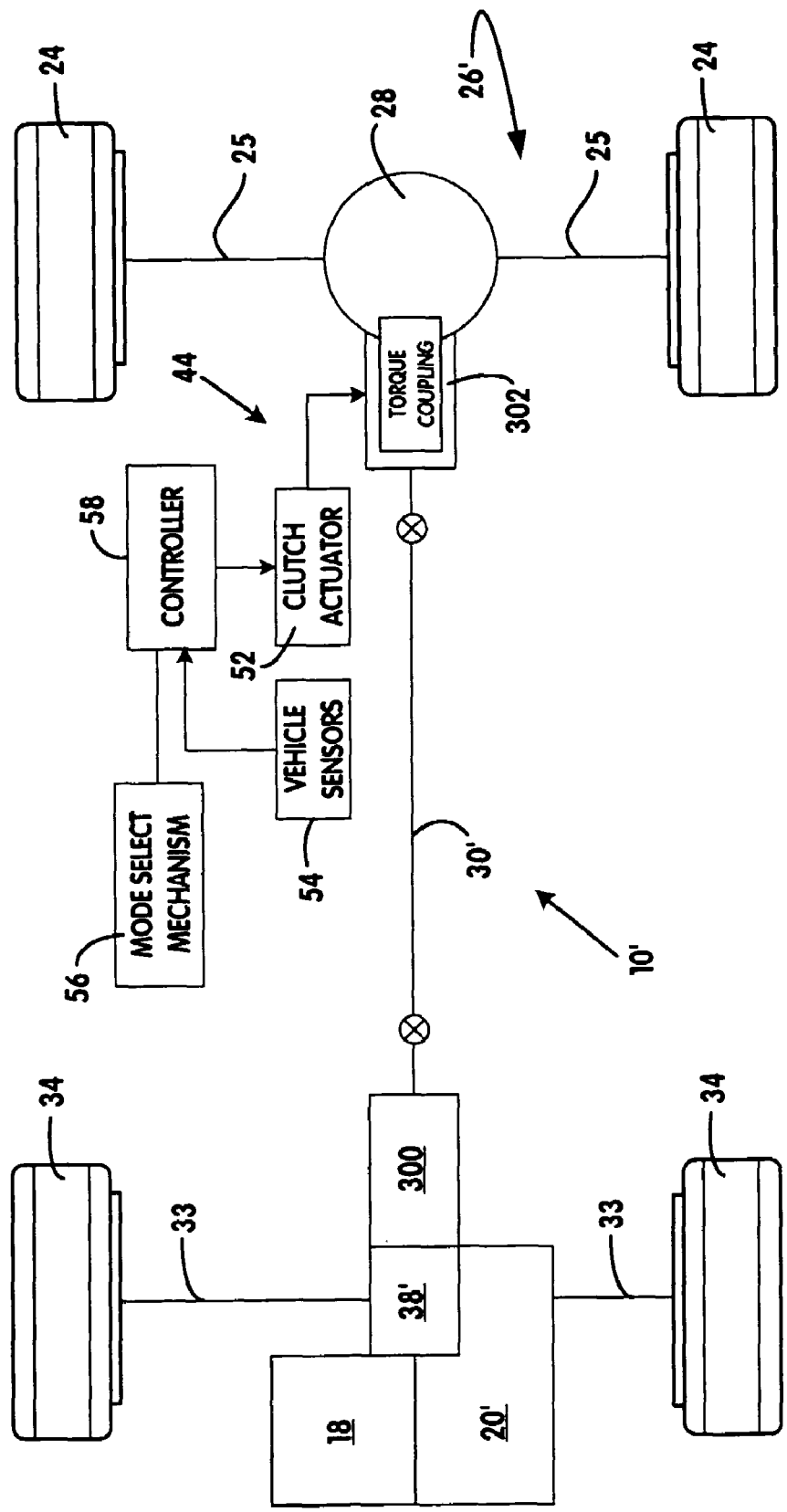
FIG. 6 is a schematic illustration of an alternative driveline for a four-wheel drive motor vehicle equipped with a power transmission device of the present invention.

To illustrate an alternative power transmission device to which the present invention is applicable, FIG. 6 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer or power take-off unit (PTU) 300 is also driven by transmission 20' for delivering drive torque to the input member of a torque transfer mechanism, such as an in-line torque transfer coupling 302, via a drive shaft 30'. Torque transfer coupling 302 is preferably integrated with the components of conventional axle assembly 26 to define a drive axle assembly 26'. In particular, the input member of torque coupling 302 is coupled to drive shaft 30' while its output member is coupled to a drive component of rear differential 28 which, in turn, drives rear wheels 24 via axleshafts 25. Accordingly, when sensors 54 indicate the occurrence of a front wheel slip condition, ECU 58 adaptively controls actuation of torque coupling 302 such that drive torque is delivered "on-demand" to rear wheels 24. It is contemplated that torque transfer coupling 302 includes a transfer clutch and an electrohydraulic clutch actuator that are similar in both structure and function to the torque transfer mechanism previously described herein. Accordingly, common reference numerals will be used hereinafter to identify components previously described.

Figure 7:
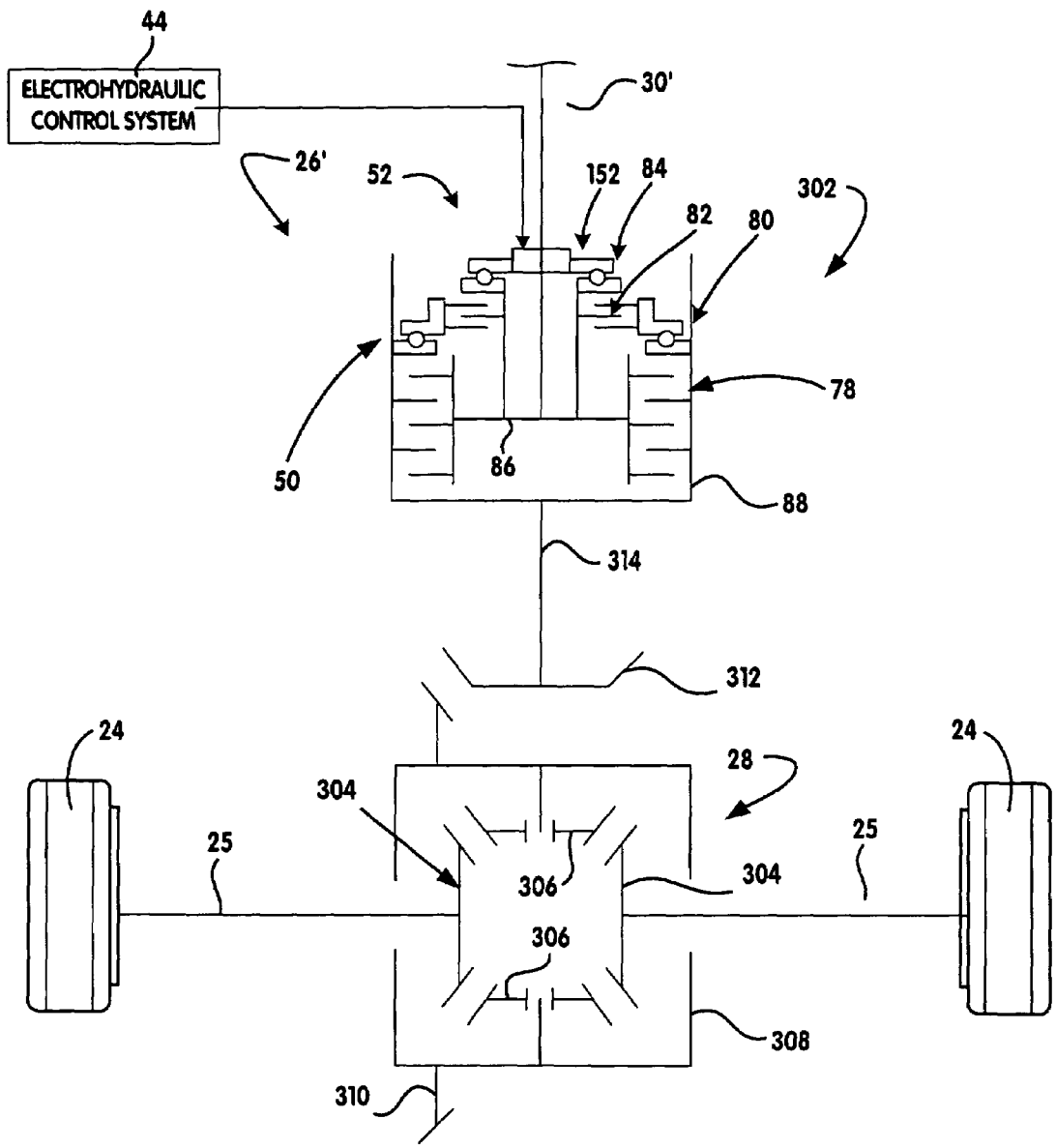
FIG. 7 is a schematic illustration of a drive axle assembly associated with the drivetrain shown in FIG. 6 and equipped with a torque transfer mechanism according to the present invention.

Referring to FIG. 7, torque coupling 302 is schematically illustrated to be operably disposed between drive shaft 30' and rear differential 28. Rear differential 28 includes a pair of side gears 304 that are connected to rear wheels 24 via rear axle shafts 25. Differential 28 also includes pinions 306 that are rotatably supported on pinion shafts fixed to a carrier 308 and which mesh with side gears 304. A right-angled drive mechanism is associated with differential 28 and includes a ring gear 310 that is fixed for rotation with carrier 308 and meshed with a pinion gear 312 that is fixed for rotation with a pinion shaft 314. Torque coupling 302 is schematically shown to include various components of transfer clutch 50 that are operably disposed between driveshaft 30' and pinion shaft 314. In particular, transfer clutch 50 is schematically shown to include main friction clutch 78 and main ball ramp unit 80 as well as pilot friction clutch 82 and pilot ball ramp unit 84. Torque coupling 302 also is shown schematically to include clutch actuator 52 that can be adaptively actuated for controlling the magnitude of the clutch engagement force applied to transfer clutch 50 and thus the amount of drive torque transferred from drive shaft 30' to rear differential 28. Actuator 52 includes rotary operator 152 and the electrohydraulic control system previously disclosed in FIG. 5 for adaptively controlling actuation of rotary operator 152. In this regard, power transfer system 44 is illustrated in block format and is contemplated to include all electrical and hydraulic components and sub-systems required to adaptively control actuation of rotary operator 152.

Torque coupling 302 permits operation in any of the drive modes previously disclosed. For example, if the on-demand 4WD mode is selected, ECU 58 regulates activation of clutch actuator 52 in response to the operating conditions detected by sensors 54 by controllably varying the electric control signal sent motor 128 and control valve 206. Selection of the part-time 4WD mode results in complete engagement of main clutch pack 90 such that pinion shaft 314 is, in effect, rigidly coupled to driveshaft 30'. Finally, in the two-wheel drive mode, main clutch pack 90 is released such that pinion shaft 312 is free to rotate relative to driveshaft 30'. Alternatively, elimination of mode select mechanism 56 would provide automatic adaptive operation of torque coupling 302.

Figure 8:
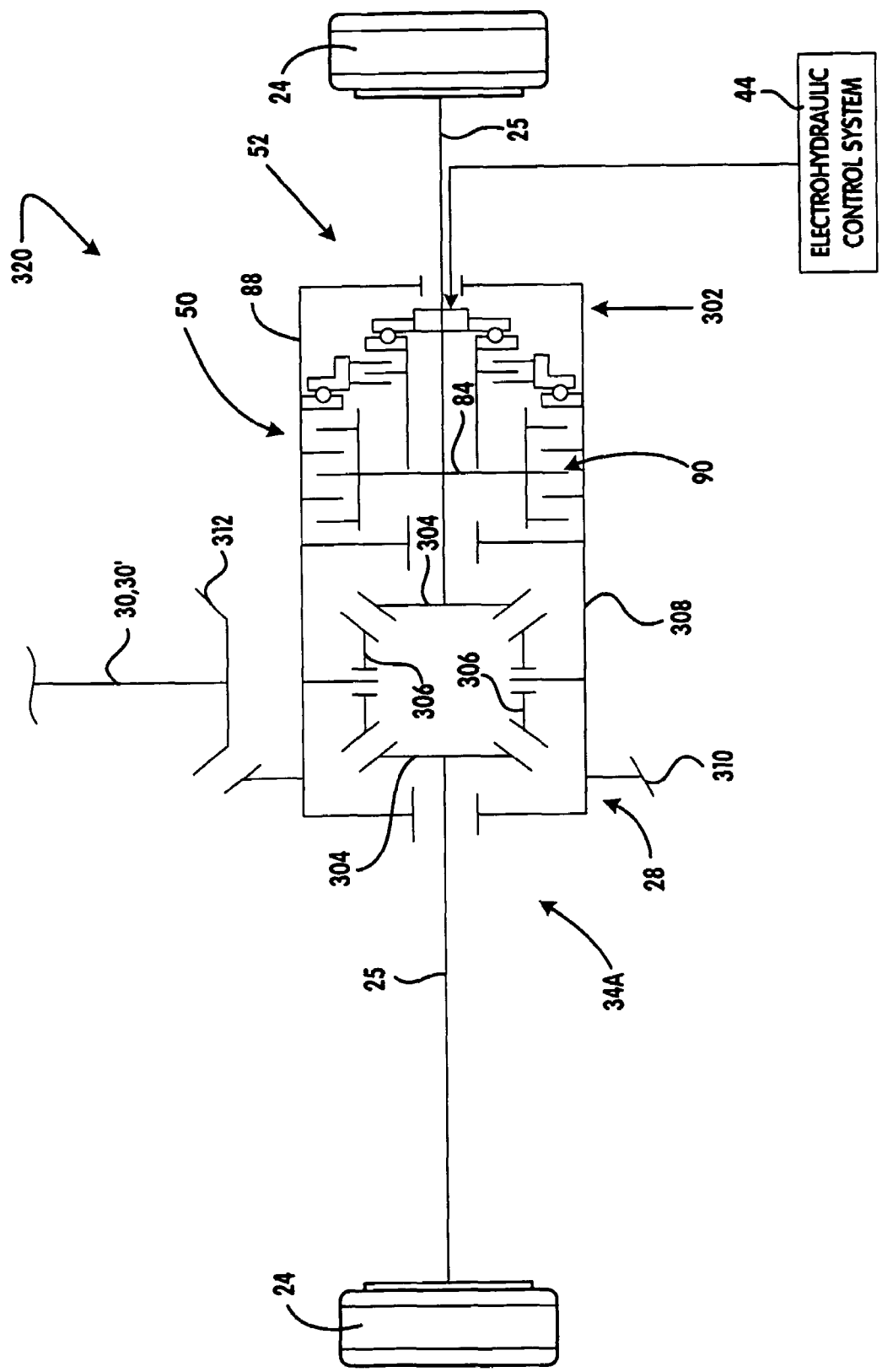
FIG. 8 is a schematic illustration of an alternative drive axle assembly operable for use with either of the drivetrain shown in FIGS. 1 and 6.

The arrangement shown for drive axle assembly 26' of FIG. 7 is operable to provide on-demand four-wheel drive by adaptively controlling the transfer of drive torque from the primary driveline to the secondary driveline. In contrast, a drive axle assembly 320 is shown in FIG. 8 wherein torque coupling 302 is now operably installed between differential case 308 and one of axleshafts 25 to provide an adaptive "side-to-side" torque biasing and slip limiting feature. As before, torque coupling 302 is schematically shown to include a transfer clutch 50 and an electrohydraulic clutch actuator 52, the construction and function of which are understood to be similar to the detailed description previously provided herein for each sub-assembly.

Figure 9:
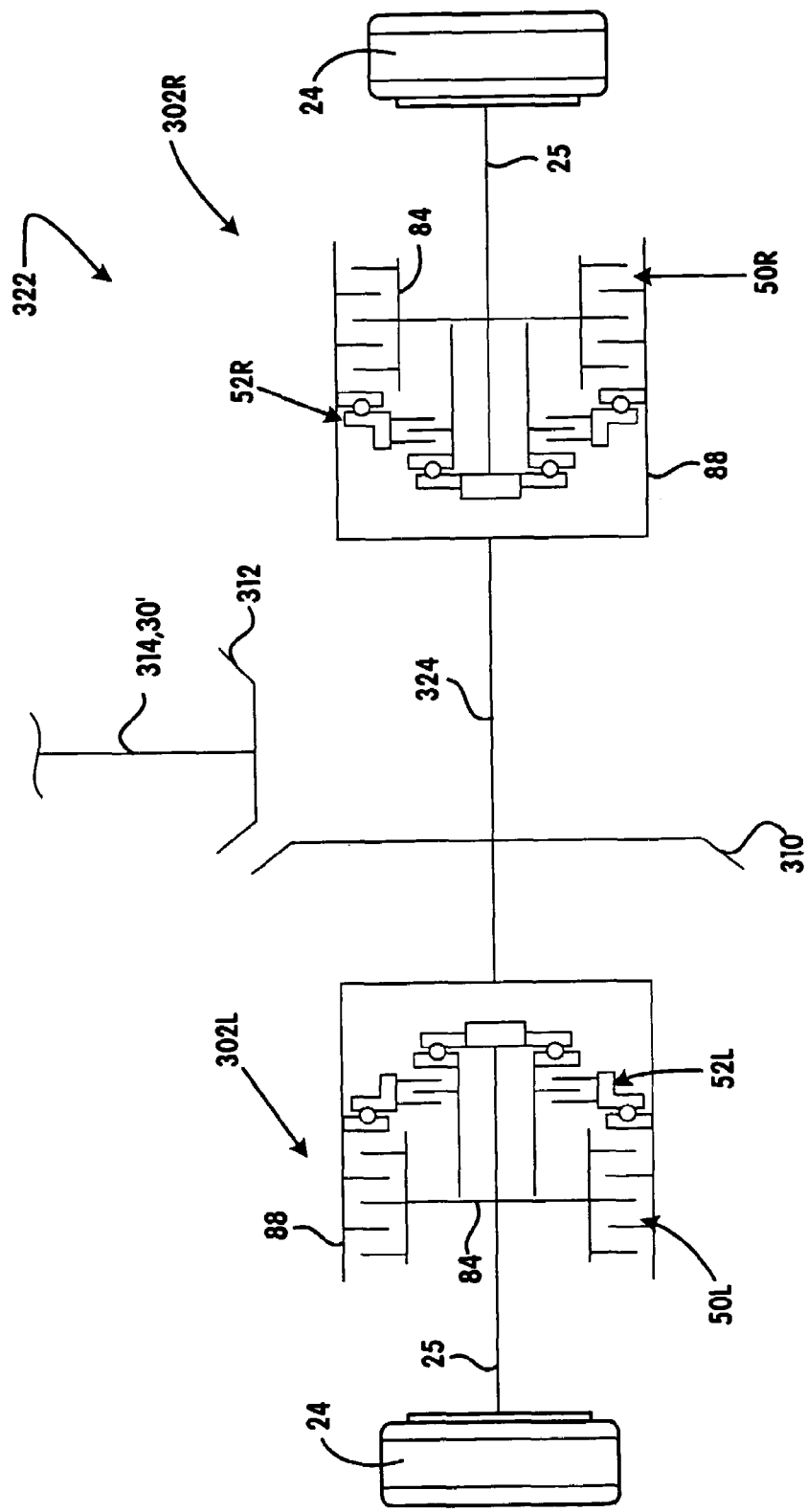
FIG. 9 is a schematic illustration of another alternative embodiment of a power transmission device according to the present invention.

Referring now to FIG. 9, a drive axle assembly 322 is schematically shown to include a pair of torque couplings 302L and 302R that are operably installed between a driven pinion shaft 314 or 30' and axleshafts 25. The driven pinion shaft drives a right-angled gearset including pinion 312 and ring gear 310 which, in turn, drives a transfer shaft 324. First torque coupling 302L is shown disposed between transfer shaft 324 and the left one of axleshafts 25 while second torque coupling 302R is disposed between transfer shaft 324 and the right axle shaft 25. Each torque coupling includes a corresponding transfer clutch 50L, 50R and electrohydraulic clutch actuator 52L, 52R. Accordingly, independent torque transfer and slip control is provided between the driven pinion shaft and each rear wheel 24 pursuant to this arrangement.

Figure 10:
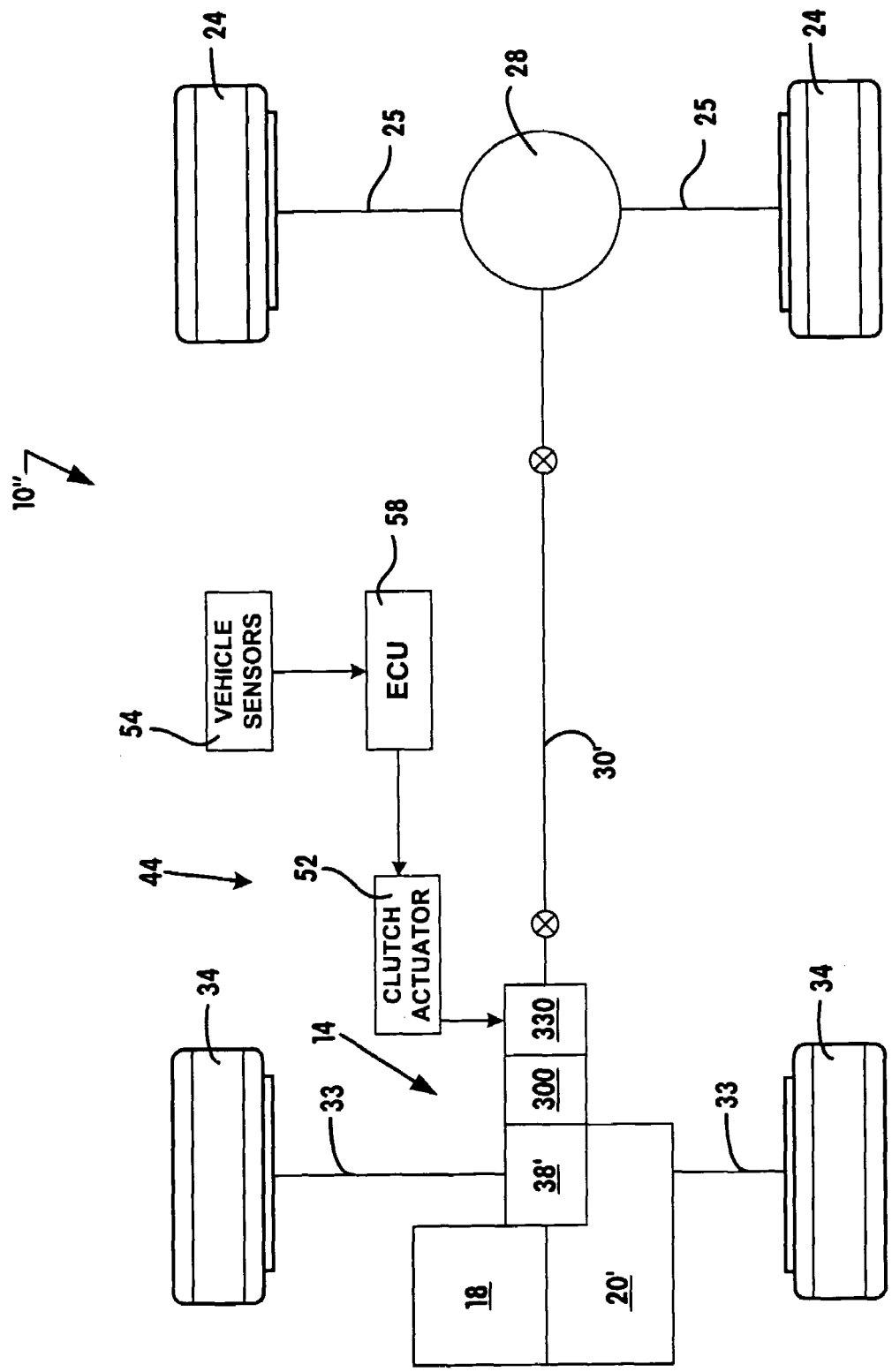
FIG. 10 illustrates another alternative drivetrain arrangement for a four-wheel drive motor vehicle equipped with another power transmission device embodying the present invention.

To illustrate additional alternative power transmission devices to which the present invention is applicable, FIG. 10 schematically depicts a front-wheel based four-wheel drive drivetrain layout 10" for a motor vehicle. In particular, engine 18 drives multi-speed transaxle 20' which has an integrated front differential unit 38' for driving front wheels 34 via axle shafts 33. As before, PTU 300 is also driven by transaxle 20' for delivering drive torque to the input member of a torque transfer coupling 330. The output member of torque transfer coupling 330 is coupled to propshaft 30' which, in turn, drives rear wheels 24 via axleshafts 25. Rear axle assembly 26 can be a traditional driven axle with a differential or, in the alternative, be similar to the drive axle arrangements described in regard to FIG. 8 or 9. Accordingly, in response to detection of certain vehicle characteristics by sensors 54 (i.e., the occurrence of a front wheel slip condition), power transfer system 44 causes torque coupling 330 to deliver drive torque "on-demand" to rear wheels 24. It is contemplated that torque coupling 330 would be generally similar in structure and function to that of torque transfer coupling 302 previously described herein. As such, its primary components of transfer clutch 50 and electrohydraulic clutch actuator 52 are again schematically shown.

Figure 11:
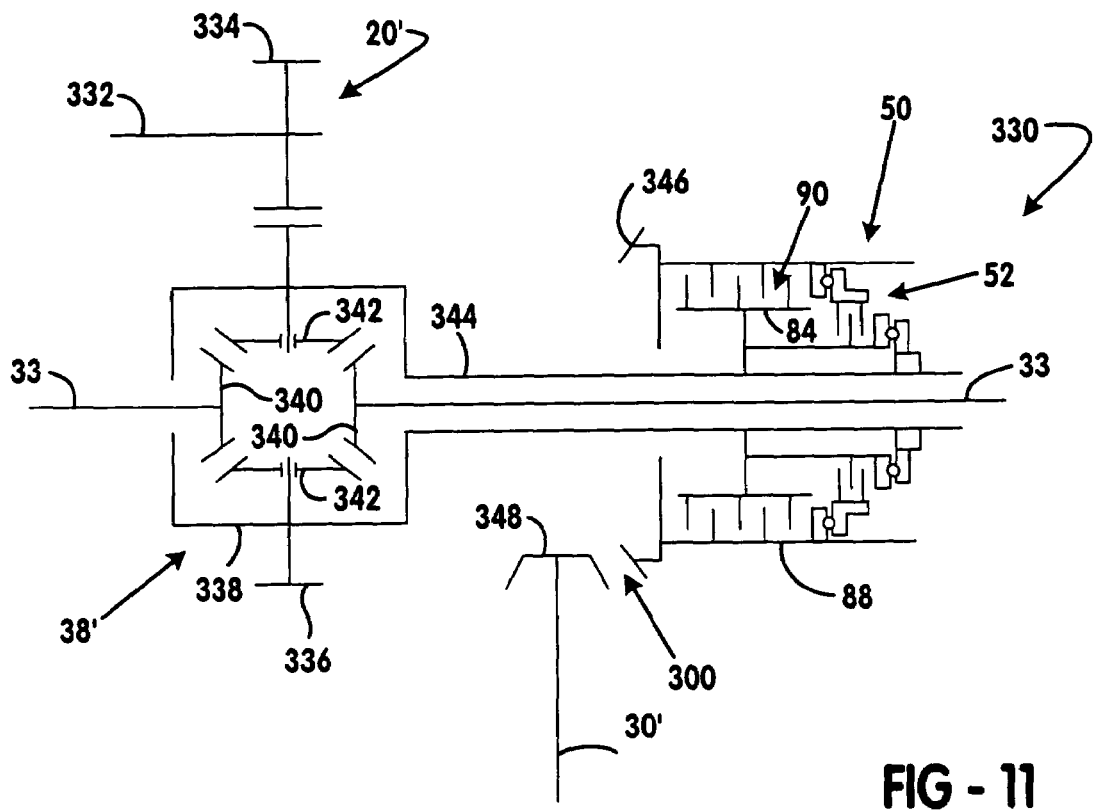
FIGS. 11 through 14 schematically illustrate different embodiments of the power transmission device shown in FIG. 10.

Referring now to FIG. 11, torque coupling 330 is schematically illustrated in association with an on-demand four-wheel drive system based on a front-wheel drive vehicle similar to that shown in FIG. 10. In particular, an output shaft 332 of transaxle 20' is shown to drive an output gear 334 which, in turn, drives an input gear 336 that is fixed to a carrier 338 associated with front differential unit 38'. To provide drive torque to front wheels 34, front differential unit 38' includes a pair of side gears 340 that are connected to front wheels 34 via axleshafts 33. Differential unit 38' also includes pinions 342 that are rotatably supported on pinion shafts fixed to carrier 338 and which are meshed with side gears 340. A transfer shaft 344 is provided for transferring drive torque from carrier 338 to a clutch hub 84 associated with transfer clutch 50. PTU 300 is a right-angled drive mechanism including a ring gear 346 fixed for rotation with drum 88 of transfer clutch 50 and which is meshed with a pinion gear 348 fixed for rotation with propshaft 30'. According to the present invention, the components schematically shown for torque transfer coupling 330 are understood to be similar to those previously described. In operation, drive torque is adaptively transferred on-demand from the primary (i.e., front) driveline to the secondary (i.e., rear) driveline.

Figure 12:
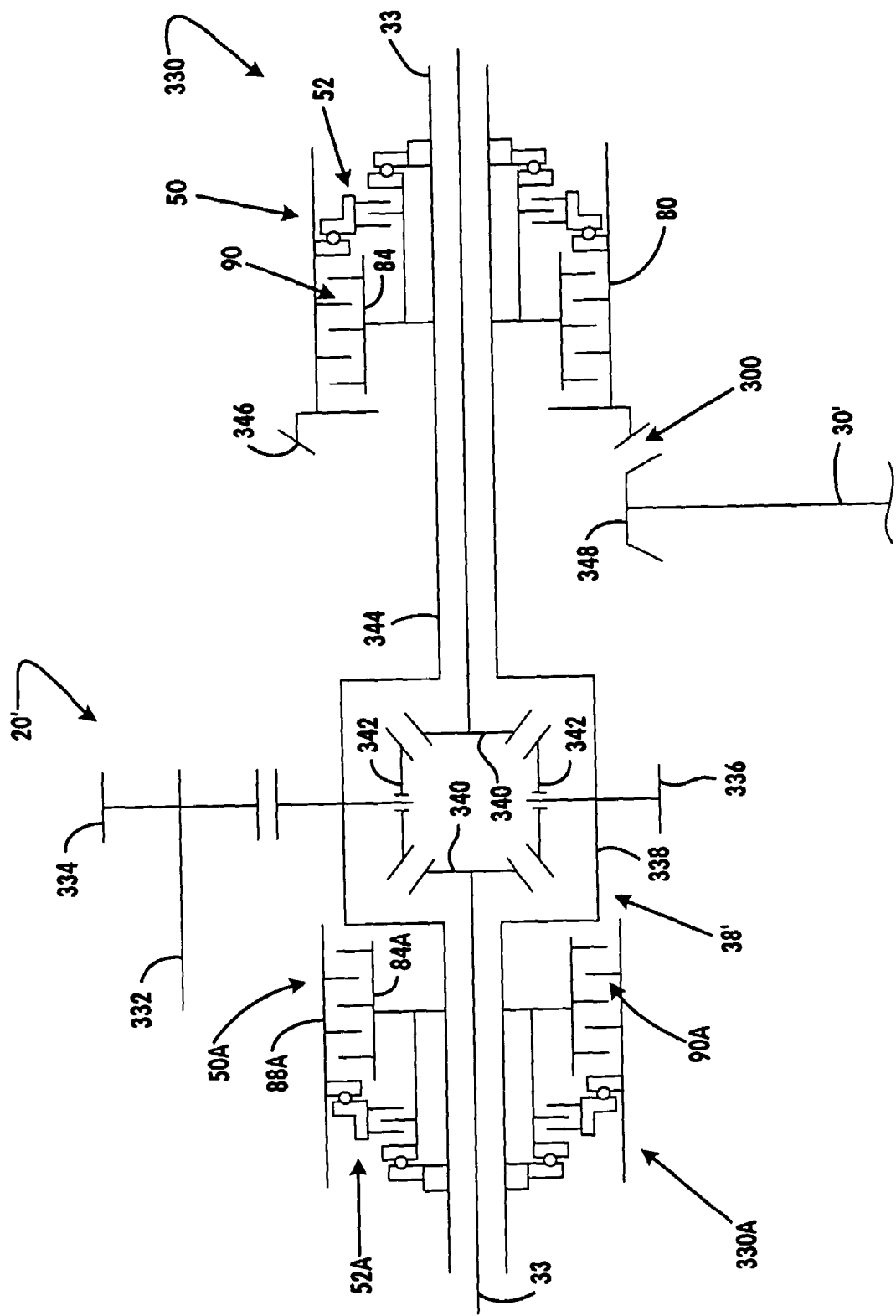

Referring to FIG. 12, a modified version of the power transmission device shown in FIG. 11 is now shown to include a second torque coupling 330A that is arranged to provide a limited slip feature in association with primary differential 38'. As before, adaptive control of torque coupling 330 provides on-demand transfer of drive torque from the primary driveline to the secondary driveline. In addition, adaptive control of second torque coupling 330A provides on-demand torque biasing (side-to-side) between axleshafts 33 of primary driveline 14.

Figure 13:
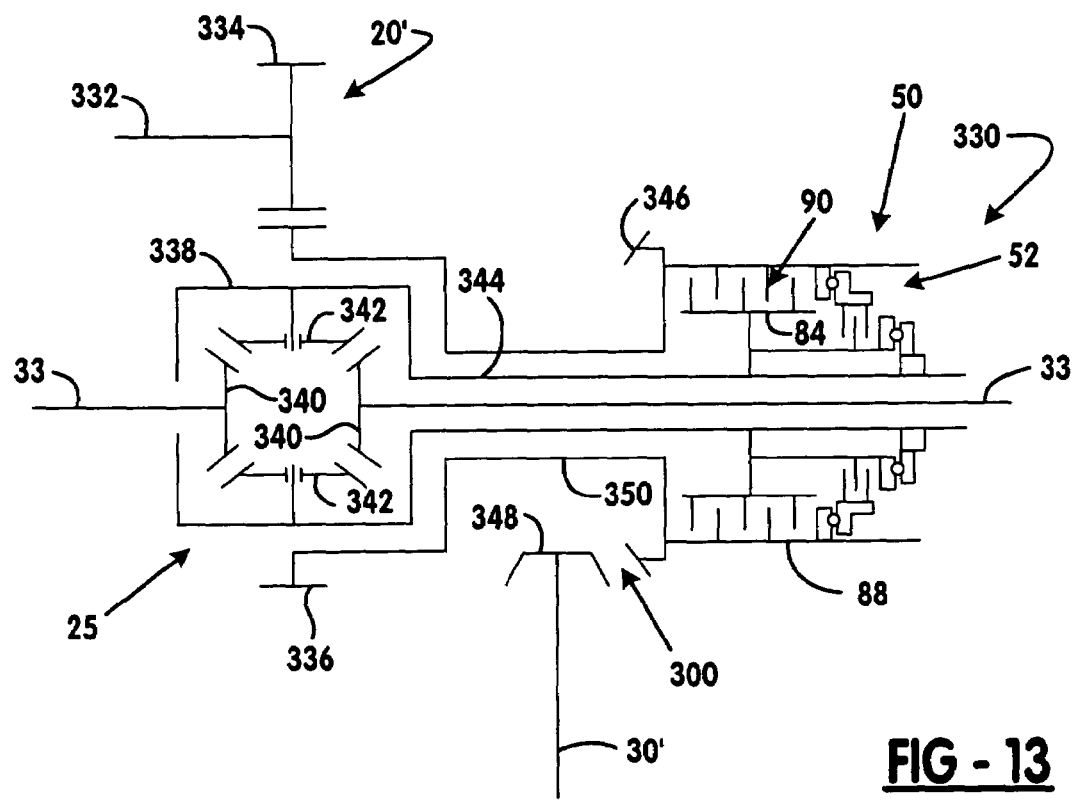

FIG. 13 illustrates another modified version of FIG. 9 wherein an on-demand four-wheel drive system is shown based on a rear-wheel drive motor vehicle that is arranged to normally deliver drive torque to rear wheels 24 while selectively transmitting drive torque to front wheels 34 through a torque coupling 330. In this arrangement, drive torque is transmitted directly from transmission output shaft 332 to power transfer unit 300 via a drive shaft 350 which interconnects input gear 336 to ring gear 346. To provide drive torque to front wheels 34, torque coupling 330 is shown operably disposed between drive shaft 350 and transfer shaft 344. In particular, transfer clutch 50 is arranged such that drum 88 is driven with ring gear 346 by drive shaft 350. As such, clutch actuator 52 functions to transfer drive torque from drum 88 through clutch pack 90 to hub 84 which, in turn, drives carrier 338 of differential unit 38' via transfer shaft 344.

Figure 14:
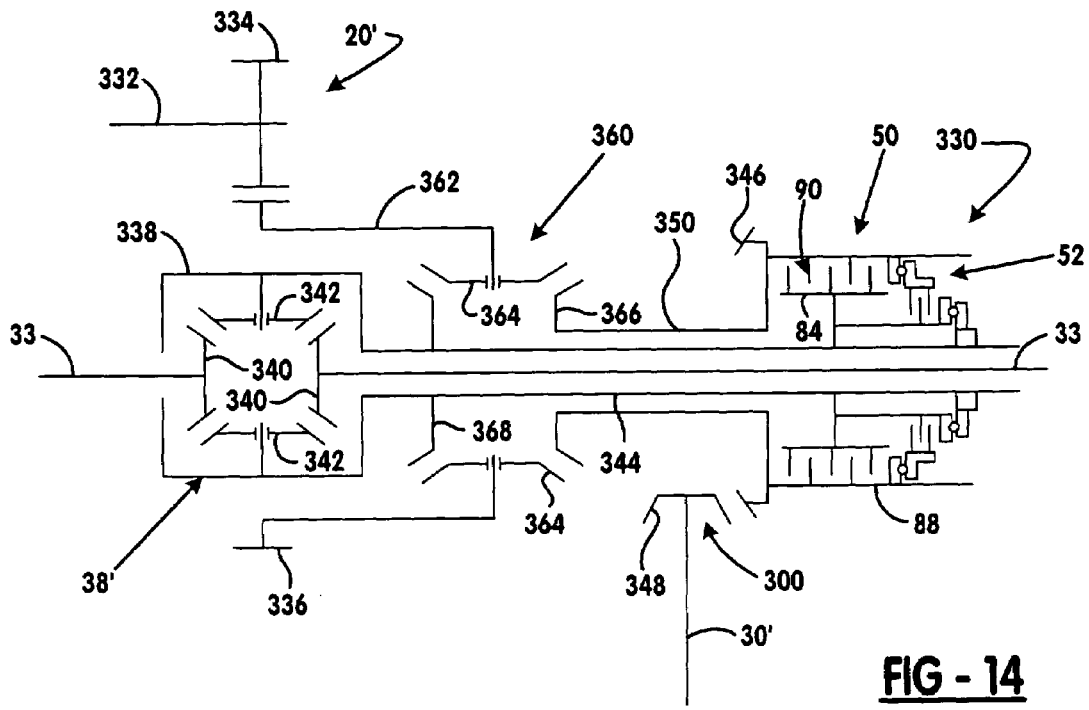

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 14 schematically illustrates a full-time four-wheel drive system which is generally similar to the on-demand four-wheel drive system shown in FIG. 13 with the exception that an interaxle differential unit 360 is now operably installed between carrier 338 of front differential unit 38' and transfer shaft 344. In particular, output gear 336 is fixed for rotation with a carrier 362 of interaxle differential 360 from which pinion gears 364 are rotatably supported. A first side gear 366 is meshed with pinion gears 364 and is fixed for rotation with drive shaft 350 so as to be drivingly interconnected to the rear driveline through power transfer unit 300. Likewise, a second side gear 368 is meshed with pinion gears 364 and is fixed for rotation with carrier 338 of front differential unit 38' so as to be drivingly interconnected to the front driveline. Torque coupling 330 is now shown to be operably disposed between side gears 366 and 368. Torque coupling 330 is operably arranged between the driven outputs of interaxle differential 360 for providing an adaptive torque biasing and slip limiting function between the front and rear drivelines.

Figure 15:
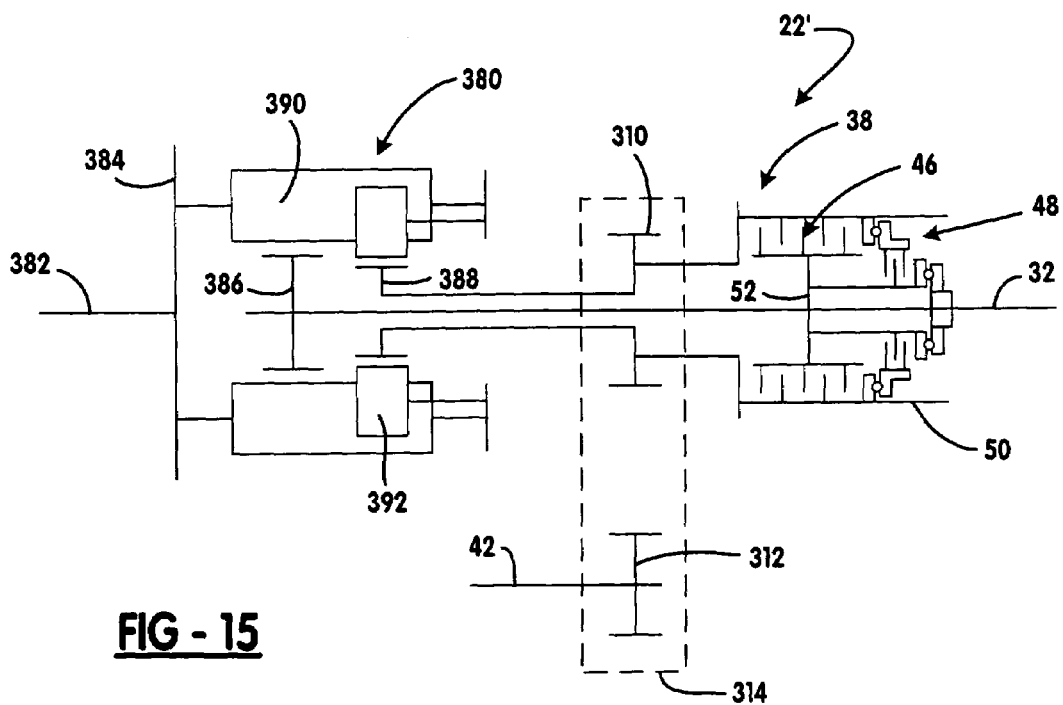
FIG. 15 is a schematic illustration of an alternative construction for the power transmission device shown in FIG. 2.

Referring now to FIG. 15, a full-time 4WD system is shown to include a transfer case 22' which is generally similar to transfer case 22 of FIG. 2 except that an interaxle differential 380 is provided between an input shaft 382 and output shafts 32 and 42. As is conventional, input shaft 382 is driven by the output of transmission 20. Differential 380 includes an input defined as a planet carrier 384, a first output defined as a first sun gear 386, a second output defined as a second sun gear 388, and a gearset for permitting speed differentiation between first and second sun gears 386 and 388. The gearset includes a plurality of meshed pairs of first planet gears 390 and second pinions 392 which are rotatably supported by carrier 384. First planet gears 390 are shown to mesh with first sun gear 386 while second planet gears 392 are meshed with second sun gear 388. First sun gear 386 is fixed for rotation with rear output shaft 32 so as to transmit drive torque to the rear driveline. To transmit drive torque to the front driveline, second sun gear 388 is coupled to transfer assembly 100 which again includes first sprocket 102 rotatably supported on rear output shaft 32, second sprocket 106 fixed to front output shaft 42, and power chain 110.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a first rotary member;
   a second rotary member;
   a torque transfer mechanism operable for transferring drive torque between said first and second members, said torque transfer mechanism having a transfer clutch disposed between said first and second rotary members and a rotary operator for applying a clutch engagement force to said transfer clutch, said rotary operator including a first component rotatably driven by one of said first and second rotary members and a second component coaxially aligned with said first component so as to define a plurality of actuation chambers therebetween, said second component is adapted to rotate relative to said first component in response to fluid pressure in said actuation chambers for generating said clutch engagement force; and a hydraulic control system for regulating the fluid pressure supplied to said actuation chambers.

2. The power transmission device of claim 1 wherein said hydraulic control system includes a pump, a motor driving said pump and a control valve disposed in a hydraulic circuit between said pump and said actuation chambers for regulating the fluid pressure supplied to said actuation chambers.

3. The power transmission device of claim 2 wherein angular movement of said second component to a low pressure position relative to said first component causes a minimum clutch actuation force to be applied to said transfer clutch, wherein angular movement of said second component to a high pressure position relative to said first component causes a maximum clutch actuation force to be applied to said transfer clutch, and wherein said second component is moveable between its low pressure and high pressure positions due to the magnitude of the fluid pressure delivered from said pump through said control valve to said actuation chambers.

4. The power transmission device of claim 1 wherein said first component of said rotary operator is a first ring having a plurality of first lugs so as to define a plurality of channels therebetween, and wherein said second component of said rotary actuator is an a second ring having a plurality of second lugs which extend into said channels so as to define a series of said actuation chambers between adjacent pairs of said first and second lugs.

5. The power transmission device of claim 4 wherein said second ring is fixed to a drive component of a thrust mechanism such that rotation of said drive component results in translational movement of a driven component of said thrust mechanism for controlling the magnitude of said clutch actuation force applied to said transfer clutch.

6. The power transmission device of claim 5 wherein said thrust mechanism is a ball ramp unit having a first cam plate as its drive component, a second cam plate as its driven component, and rollers engaging a cam surface formed between said first and second cam plates, and wherein said cam surface is configured to cause translational movement of said second cam plate in response to rotary movement of said first cam plate.

7. The power transmission device of claim 6 wherein an increase in fluid pressure in said actuation chambers causes said second ring and said first cam plate to rotate in a first direction relative to said first ring for causing corresponding translational movement of said second cam plate from a first position toward a second position relative to said transfer clutch, and wherein a decrease in fluid pressure in said actuation chambers causes said second ring and said first cam plate to rotate in a second direction relative to said reaction ring for causing movement of said second cam plate toward its first position.

8. The power transmission device of claim 1 wherein said first rotary member is a first shaft in a transfer case and said second rotary member is a second shaft of said transfer case.

9. The power transmission device of claim 1 wherein said first rotary member is driven by a powertrain of a motor vehicle and said second rotary member is connected to a differential unit of a drive axle assembly.

10. The power transmission device of claim 1 defining a drive axle assembly having a differential unit interconnecting a pair of axleshafts, and wherein said first rotary member is a differential carrier of said differential unit, said second rotary member is one of said axleshafts, and said torque transfer mechanism is arranged to adaptively limit slip between said axleshafts.

11. A power transfer device for use in a motor vehicle having a powertrain and first and second drivelines, comprising:
a first shaft driven by the powertrain and adapted for connection to the first driveline;
a second shaft adapted for connection to the second driveline;
a torque transmission mechanism for transferring drive torque from said first shaft to said second shaft, said torque transmission mechanism including a transfer clutch operably disposed between said first shaft and said second shaft and a clutch actuator for engaging said transfer clutch, said clutch actuator includes a rotary operator and a thrust mechanism, said rotary operator having first and second components which define an actuation chamber that is adapted to receive pressurized fluid, said first component is fixed for rotation with one of said first and second shafts and said second component is adapted to rotate relative to said first component in response to the pressurized fluid in said actuation chamber, said thrust mechanism operable for applying a clutch actuation force to said transfer clutch in response to rotation of said second component relative to said first component; and
a control system for regulating the pressurized fluid supplied to said actuation chamber.

12. The power transfer device of claim 11 wherein angular movement of said second component to a low pressure position relative to said first component causes said thrust mechanism to be located in a first position for causing a minimum clutch engagement force to be applied to said transfer clutch, wherein angular movement of said second component to a high pressure position relative to said first component causes said thrust mechanism to move to a second position for causing a maximum clutch engagement force to be applied to said transfer clutch, and wherein said second component is moveable between its low pressure and high pressure positions due to the magnitude of the pressurized fluid delivered from a pump through a control valve to said actuation chamber.

13. The power transfer device of claim 12 wherein said first component of said rotary operator is a reaction ring having a first body segment and a plurality of first lugs which define a series of channels therebetween, wherein said second component is an actuator ring having a second body segment and a plurality of second lugs which extend into said channels so as to define a plurality of said actuation chambers between said first and second lugs, and wherein said actuator chambers are in fluid communication with an outlet of said control valve and said fluid pump is operable to draw low pressure fluid from a sump and deliver high pressure fluid to said control valve such that selective control of said control valve results in rotary movement of said actuator ring relative to said reaction ring.

14. The power transfer device of claim 13 wherein said actuator ring is fixed to a drive component of said thrust mechanism such that rotation of said drive component results in translational movement of a driven component of said thrust mechanism for exerting said clutch actuation force on said second friction clutch.

15. The power transfer device of claim 14 wherein said thrust mechanism is a ball ramp unit with a first cam ring as its drive component, a second cam ring as its driven component, and rollers retained in cam tracks formed between said first and second cam rings, and wherein said cam tracks are configured to cause translational movement of said second cam plate relative to said transfer clutch in response to rotary movement of said first cam plate.

16. A power transfer device for use in a motor vehicle having a powertrain and first and second drivelines, comprising:
an input member adapted to receive drive torque from said powertrain;
a first output member adapted to provide drive torque to the first driveline;
a second output member adapted to provide drive torque to the second driveline;
a gearset operably interconnecting said input member to said first and second output members;
a torque transmission mechanism for limiting speed differentiation between said first and second output members, said torque transmission mechanism including a transfer clutch operably disposed between any two of said input member and said first and second output members and a clutch actuator for controlling engagement of said transfer clutch, said clutch actuator including a rotary operator and a thrust mechanism, said rotary operator having first and second components defining an actuation chamber therebetween that is adapted to receive pressurized fluid, said first component is fixed for rotation with one of said input and output members and said second component is adapted to rotate relative to said first component in response to the pressurized fluid in said actuation chamber, said thrust mechanism operable for applying a clutch actuation force to said transfer clutch in response to rotation of said second component relative to said first component; and
a hydraulic control system for regulating the pressurized fluid supplied to said actuation chamber.

17. The power transfer device of claim 16 wherein movement of said second component to a low pressure position relative to said first component causes said thrust mechanism to be located in a first position for applying a minimum actuation force to said transfer clutch, wherein movement of said second component to a high pressure position relative to said first component causes said thrust mechanism to move to a second position for applying a maximum actuation force to said transfer clutch, and wherein said second component is moveable between its low pressure and high pressure positions due to the magnitude of the pressurized fluid delivered from a pump through a control valve to said actuation chamber.

18. The power transfer device of claim 17 wherein said first component of said rotary operator is a reaction ring having a plurality of first lugs which define a series of channels therebetween, and said second component is an actuator ring having a plurality of second lugs which extend into said channels so as to define a plurality of said actuation chambers between said first and second lugs, wherein said actuator chambers are in fluid communication with an outlet of said control valve, and wherein said fluid pump is operable to draw fluid from a sump and deliver fluid through said control valve to said actuation chambers for causing rotary movement of said actuator ring relative to said reaction ring.

19. The power transfer device of claim 18 wherein said actuator ring is fixed to a drive component of said thrust mechanism such that rotation of said drive component results in translational movement of a driven component of said thrust mechanism for controlling the magnitude of said clutch actuation force applied to said transfer clutch.

20. The power transfer device of claim 19 wherein said thrust mechanism is a ball ramp unit with a first cam ring as its drive component, a second cam ring as its driven component, and rollers retained in cam tracks formed between said first and second cam rings, said cam tracks configured to cause translational movement of said second cam ring in response to rotary movement of said first cam ring, and wherein such movement of said second cam ring causes said clutch actuation force to be applied to said transfer clutch.

21. The power transfer device of claim 20 wherein an increase in pressure of the pressurized fluid in said actuation chambers causes said actuator ring and said first cam ring to rotate in a first direction relative to said reaction ring for causing said second cam ring to axially move from a retracted position toward an extended position relative to said transfer clutch, and wherein a decrease in pressure of the pressurized fluid in said actuation chambers causes said actuator ring and said first cam ring to rotate in a second direction relative to said reaction ring for causing said second cam ring to axially move toward its retracted position.

22. A torque transfer mechanism for controlling transfer of drive torque between first and second rotary members comprising:
a transfer clutch operably disposed between the first and second rotary members;
a rotary clutch operator having coaxially aligned first and second components defining a plurality of actuation chambers therebetween; and
a hydraulic control system operable for controlling fluid pressure delivered to said actuation chambers so as to control angular movement of said second component relative to said first component for controlling the magnitude of a clutch engagement force applied to said transfer clutch.

23. The power transmission device of claim 22 wherein said hydraulic control system includes a pump, a motor driving said pump and a control valve disposed in a hydraulic circuit between said pump and said actuation chambers for regulating the fluid pressure supplied to said actuation chambers.

24. The power transmission device of claim 22 wherein angular movement of said second component to a low pressure position relative to said first component causes a minimum clutch actuation force to be applied to said transfer clutch, wherein angular movement of said second component to a high pressure position relative to said first component causes a maximum clutch actuation force to be applied to said transfer clutch, and wherein said second component is moveable between its low pressure and high pressure positions due to the magnitude of the fluid pressure delivered from said pump through said control valve to said actuation chambers.

25. The power transmission device of claim 22 wherein said first component of said rotary operator is a reaction ring having a body segment and plurality of first lugs so as to define a plurality of channels therebetween, and wherein said second component of said rotary actuator is an actuator ring having a body segment and a plurality of second lugs which extend into said channels so as to define a series of said actuation chambers between adjacent pairs of said first and second lugs.

26. The power transmission device of claim 25 wherein said actuator ring is fixed to a drive component of a thrust mechanism such that rotation of said drive component results in translational movement of a driven component of said thrust mechanism for controlling the magnitude of said clutch actuation force applied to said transfer clutch.

27. The power transmission device of claim 26 wherein said thrust mechanism is a ball ramp unit having a first cam plate as its drive component, a second cam plate as its driven component, and rollers retained in cam tracks formed between said first and second cam plates, and wherein said cam tracks are configured to cause translational movement of said second cam plate in response to rotary movement of said first cam plate.

28. The power transmission device of claim 22 wherein the first rotary member is a first shaft in a transfer case and the second rotary member is a second shaft of said transfer case.

29. The power transmission device of claim 22 wherein the first rotary member is driven by a powertrain of a motor vehicle and the second rotary member is connected to a differential unit of a drive axle assembly.

* * * * *